Patented July 15, 1952

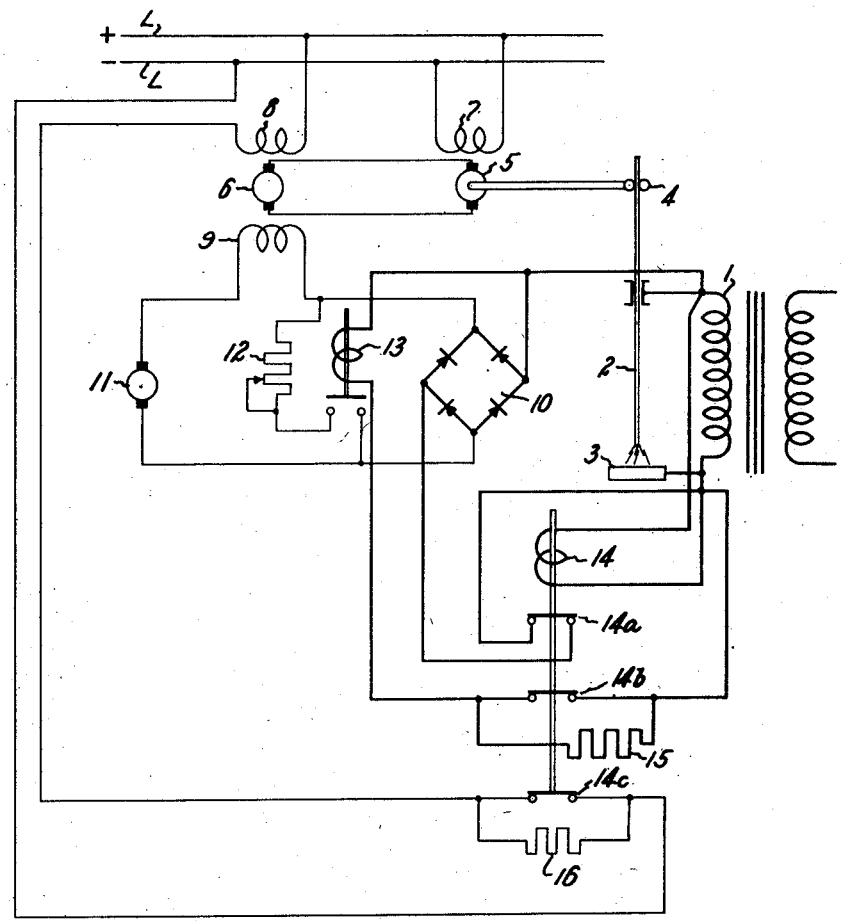

2,603,760

UNITED STATES PATENT OFFICE 2,603,760

AUTOMATICALLY CONTROLLED ALTERNATING CURRENT ARC WELDING APPARATUS

Hermann Kocher, Wettingen, Switzerland, assignor to Aktiengesellschaft Brown, Boveri & Cie, Baden, Switzerland, a joint-stock company Application July 2, 1951, Serial No. 234,704
In Switzerland July 8, 1950

6 Claims. (Cl. 314—76)

This invention relates to automatically controlled arc welding apparatus operating on alternating current, and more particularly to apparatus in which the electrode is adjusted towards and away from the work piece by a direct current motor energized by a Ward Leonard generator.

Arc welders operating on direct current have employed an electrode feed driven by a reversible direct current motor energized by a Ward Leonard generator having a constant, separately excited field winding and a differential field winding excited at arc potential and by a constant auxiliary potential opposing the arc potential in such manner that the current through the differential winding is zero at a preselected value of the arc potential but rises sharply in positive or negative sense when the arc potential deviates in one direction or the other from the preselected value. It has been proposed to employ a similar arrangement for the automatic control of arc welders operating on alternating current through use of a rectifier to convert the alternating arc potential to a direct current potential. Under normal operating conditions, however, and particularly for igniting the arc, the current through the differential winding must be of negative or reversed polarity, but the negative current was blocked by the rectifier and the proposed system was not operative.

Objects of this invention are to provide alternating current arc welding apparatus including an electrode feed of the reversible direct current motor and Ward Leonard generator type, and which eliminates the blocking action of the rectifier which develops a direct current potential from the alternating current arc potential. Objects are to provide arc welders of the stated character in which the Ward Leonard generator has a differential field winding connected to a constant source of counter potential and to a rectifier of the arc potential, and automatic switches or voltage responsive relays de-energize the differential field winding under no-load conditions, i. e., in the absence of a welding arc. More specifically, an object is to provide arc welders as above stated in which one switch closes to connect the source of counter potential across the differential field winding when the electrode touches the work piece, thereby reversing the electrode feed motor to draw an arc, the other switch closes simultaneously to connect the rectifier across the source of welding potential, and the first switch opens when the arc potential nears its preselected mean value.

These and other objects and the advantages of the invention will be apparent from the following specification when taken with the accompanying drawing in which the single view is a circuit diagram of an embodiment of the invention.

In the diagram, the reference numeral 1 identifies the secondary winding of a welding transformer, one terminal of the winding being connected to the electrode 2 and the other terminal being connected to the work piece 3. The electrode is adjusted by feed rollers 4 driven by a reversible direct current motor 5 which is energized by a Ward Leonard generator 6. The motor 5 and generator 6 have separately excited field windings 7 and 8, respectively, connected across a line L, L from a source of constant direct current potential, not shown. The Ward Leonard generator has a differential field winding 9 in series circuit with a rectifier 10 and an auxiliary generator 11 which develops a counter potential of constant magnitude. If convenient and desired, the auxiliary generator 11 may be driven by the same motor, not shown, which drives the Ward Leonard generator 6.

An adjustable resistance 12 and the contacts of an automatic switch or relay 13 are shunted across the rectifier 10 to connect the counter potential source 11 in series with the winding 9 and resistance 12 when the contacts of the relay 13 are closed. The rectifier 10 is connected across the transformer winding 1 through the contacts 14a of a switch or relay 14 having a winding which is also shunted across the winding 1. The relay 13 may be connected directly across the winding 1 but preferably, and to avoid undue heating under no-load when the voltage across the winding 1 rises to a high value, the relay 13 is in series with a resistance 15 which is shorted by the contacts 14b of the relay 14 when the latter is de-energized.

A resistance 16 which is shorted out by contacts 14c of the relay 14 under normal operating conditions may be connected in series with the field winding 8 of the Ward Leonard generator to decrease the excitation of that winding under no-load conditions.

The relay 13 pulls in at a voltage somewhat less than minimum expected or operative value of the arc voltage, and the relay 14 pulls in at a voltage somewhat higher than the expected arc voltage. The constant counter potential of the auxiliary generator 11 is somewhat less than the operative range of rectified welding potential values but the potential differential must be sufficient for regulation of the speed of electrode feed by the expected variations in the arc potential.

The method of operation is as follows:

Before ignition of the arc, the potential across the winding 1 is relatively high and relays 13 and 14 are energized or pulled in to open their contacts. The differential winding 9 is thus de-energized and the electrode 2 is fed towards the work piece 3 at a speed which is determined solely by the constant excitation of the field winding 8 of the Ward Leonard generator. This forward feed of the electrode 2 is somewhat slowed down, prior to ignition, when the resistance 16 is provided, as shown in the drawing, in series with the winding 8. When the electrode 2 contacts the work piece 3, the transformer winding 1 is short-circuited and its potential drops substantially to zero thereby de-energizing the relays 13 and 14. The contacts of relay 13 close to impose the counter potential of the auxiliary generator 11 across the differential winding 9 and thereby effect a reversal of the motor 5 to move the electrode 2 away from the work piece. This reverse movement continues until the arc potential approaches its normal range of values and the relay 13 then pulls in to open its contacts and connect the generator 11 in series with the winding 9 and the rectifier 10. This completes the ignition of the arc and, under normal operating conditions, the contacts of relay 13 are open and the contacts of relay 14 are closed.

The polarities of the output potentials of the rectifier 10 and the counter potential generator 11 are opposed, and the speed of the feed motor 5 is determined by the positive increment by which the rectified potential exceeds the constant value, opposed potential, output of the generator 11. The current in the differential field winding 9 always flows in the same sense during normal operation and blocking action of the rectifier is thus eliminated. The current through the differential winding 9 has a small positive value at the preselected arc potential, and the regulating impulses dependent upon the rectified arc potential are superposed upon this small positive potential value but are not of sufficient magnitude to effect a reversal of potential.

If the arc is extinguished for any reason, or if the arc potential rises to some abnormal value, the relay 14 pulls in to de-energize the differential field winding 9 and the electrode 2 is again advanced by the motor 5 to re-strike the arc.

The invention is not limited to the specifically described and illustrated embodiment of the invention as modifications which may occur to those familiar with the art fall within the spirit and scope of the invention as set forth in the following claims.

I claim:

1. In arc welding apparatus including an electrode and a work piece, a source of alternating current to be connected across the electrode and work piece, a separately-excited direct current motor for feeding the electrode towards and away from the work piece, a Ward Leonard generator for energizing said motor, said generator including a separately excited field winding and a differential field winding, a rectifier having sets of input and output terminals, a source of counterpotential of constant magnitude, circuit elements connecting said differential field winding and source of counterpotential in series with the rectifier output terminals, the rectifier output potential being opposed to and greater than the potential of said source of counterpotential over the range of arc voltage variation, a voltage responsive relay comprising a winding and a set of back contacts, said winding being connected across said source of alternating current, circuit elements including said set of back contacts connecting the input terminals of said rectifier across said source of alternating current, and means operative upon a drop of the potential of said alternating current source below the desired range of arc potential to close a by-pass circuit connected between the output terminals of said rectifier, thereby to effect a reversal of the electrode feed motor upon a contact of the electrode with the work piece.

2. In arc welding apparatus, the invention as recited in claim 1, wherein said means comprises a second voltage responsive relay having a set of back contacts in series in said by-pass circuit, and circuit means connecting said second relay across said source of alternating current, said second relay having a pull-in potential approximating and less than the minimum desired arc potential.

3. In arc welding apparatus, the invention as recited in claim 2, wherein said circuit means includes a resistance in series with said second relay, and said first relay has a second set of back contacts for short-circuiting said resistance.

4. In arc welding apparatus, the invention as recited in claim 1, wherein the pull-in potential of said relay is greater than the maximum desired arc potential.

5. In arc welding apparatus, the invention as recited in claim 1, wherein an adjustable resistance is in series in said by-pass circuit.

6. In arc welding apparatus, the invention as recited in claim 1, in combination with a resistance in series with said separately excited field winding of said generator, and wherein said first relay has a set of back contacts for short-circuiting said resistance.

HERMANN KOCHER.

No references cited.